US010664354B2

(12) United States Patent
Nanivadekar et al.

(10) Patent No.: US 10,664,354 B2
(45) Date of Patent: May 26, 2020

(54) SELECTING A RESOURCE TO BE USED IN A DATA BACKUP OR RESTORE OPERATION

(75) Inventors: Mandar Nanivadekar, Bangalore (IN); Shishir Misra, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 240 days.

(21) Appl. No.: 14/424,767

(22) PCT Filed: Aug. 31, 2012

(86) PCT No.: PCT/US2012/053416
§ 371 (c)(1),
(2), (4) Date: Feb. 27, 2015

(87) PCT Pub. No.: WO2014/035416
PCT Pub. Date: Mar. 6, 2014

(65) Prior Publication Data
US 2015/0193312 A1 Jul. 9, 2015

(51) Int. Cl.
*G06F 11/14* (2006.01)
*G06F 9/44* (2018.01)
(52) U.S. Cl.
CPC .......... *G06F 11/1458* (2013.01); *G06F 9/44* (2013.01); *G06F 11/1469* (2013.01); *G06F 2201/80* (2013.01)
(58) Field of Classification Search
CPC .... G06F 11/1458; G06F 9/44; G06F 11/1469; G06F 2201/80

(Continued)

(56) References Cited

U.S. PATENT DOCUMENTS 6,826,665 B1 11/2004 Nambu
7,194,491 B2 3/2007 Inagaki
(Continued)

FOREIGN PATENT DOCUMENTS

CN 101410784 4/2009
CN 102099794 6/2011

OTHER PUBLICATIONS

European Patent Office, "Extended European Search Report", 12883899.2, dated Mar. 16, 2017, 7 pages.
(Continued)

*Primary Examiner* — Syed H Hasan
*Assistant Examiner* — Nicholas E Allen
(74) *Attorney, Agent, or Firm* — Hewlett Packard Enterprise Patent Department

(57) ABSTRACT

Techniques for selecting a resource to be used in a data backup or restore operation are described in various implementations. An example method that implements the techniques may include determining, using a computing system, diagnostic information associated with a plurality of candidate resources that are available for use in a data backup or restore operation. The method may also include selecting, using the computing system, a recommended resource from among the plurality of candidate resources, the recommended resource being selected based at least in part on the diagnostic information. The method may also include causing the data backup or restore operation to be performed using the recommended resource.

19 Claims, 2 Drawing Sheets

(58) Field of Classification Search
USPC .......................................................... 707/654
See application file for complete search history.

(56) References Cited

U.S. PATENT DOCUMENTS

| | | | |
|---|---|---|---|
| 7,933,983 B2 | 4/2011 | Steele et al. | |
| 8,112,579 B2 | 2/2012 | Imai | |
| 8,140,914 B2 | 3/2012 | Murphy et al. | |
| 8,145,864 B1* | 3/2012 | Helliker | G06F 11/1458 707/644 |
| 2005/0262168 A1* | 11/2005 | Helliker | G06F 11/1446 |
| 2005/0278299 A1 | 12/2005 | Yamada et al. | |
| 2007/0079170 A1 | 4/2007 | Zimmer et al. | |
| 2007/0234115 A1* | 10/2007 | Saika | G06F 11/2028 714/13 |
| 2008/0010500 A1* | 1/2008 | Shimmitsu | G06F 11/1662 714/6.32 |
| 2008/0140944 A1 | 6/2008 | Arakawa et al. | |
| 2009/0307285 A1 | 12/2009 | Gipp et al. | |
| 2010/0125903 A1* | 5/2010 | Devarajan | G06F 21/577 726/15 |
| 2010/0299309 A1* | 11/2010 | Maki | G06F 11/1479 707/640 |
| 2011/0047341 A1* | 2/2011 | Yu | G06F 11/1464 711/162 |
| 2011/0082837 A1* | 4/2011 | Cherkasova | G06F 11/1461 707/654 |
| 2011/0099146 A1* | 4/2011 | McAlister | G06F 11/3006 707/634 |
| 2011/0218968 A1* | 9/2011 | Liu | G06F 3/0482 707/649 |
| 2011/0246732 A1* | 10/2011 | Amano | G06F 11/1456 711/162 |
| 2012/0005167 A1* | 1/2012 | Khatawate | G06F 11/1456 707/654 |
| 2012/0079325 A1 | 3/2012 | Riegel et al. | |
| 2012/0089572 A1 | 4/2012 | Raichstein | |
| 2012/0095968 A1* | 4/2012 | Gold | G06F 11/1456 707/652 |
| 2012/0117029 A1* | 5/2012 | Gold | G06F 11/1451 707/651 |
| 2012/0150808 A1* | 6/2012 | Hubner | G06F 11/1464 707/652 |
| 2012/0150810 A1* | 6/2012 | Yu | G06F 11/1461 707/654 |

OTHER PUBLICATIONS

"Quantum's New Sage in the Enterprise"; Data Mobility Group; White Paper; Jul. 2003 5 pages.

International Searching Authority, Appl. No. PCT/US2012/053416, Search Report and Written Opinion, 9 pages, dated Apr. 1, 2013.

* cited by examiner

SELECTING A RESOURCE TO BE USED IN A DATA BACKUP OR RESTORE OPERATION

CROSS-REFERENCE TO RELATED APPLICATION

This application is a national stage application under 35 U.S.C. § 371 of PCT/US2012/053416, filed Aug. 31, 2012.

BACKGROUND

Many companies place a high priority on the protection of data. In the business world, the data that a company collects and uses is often the company's most important asset, and even a relatively small loss of data or data outage may have a significant impact. In addition, companies are often required to safeguard their data in a manner that complies with various data protection regulations. As a result, many companies have made sizeable investments in data protection and data protection strategies.

As one part of a data protection strategy, many companies perform backups of portions or all of their data. Data backups may be executed on an as-needed basis, but more typically are scheduled to execute on a recurring basis (e.g., nightly, weekly, or the like). Such data backups may serve different purposes. For example, one purpose may be to allow for the recovery of data that has been lost or corrupted. Another purpose may be to allow for the recovery of data from an earlier time—e.g., to restore previous versions of files and/or to restore a last known good configuration.

DETAILED DESCRIPTION

Figure 1:
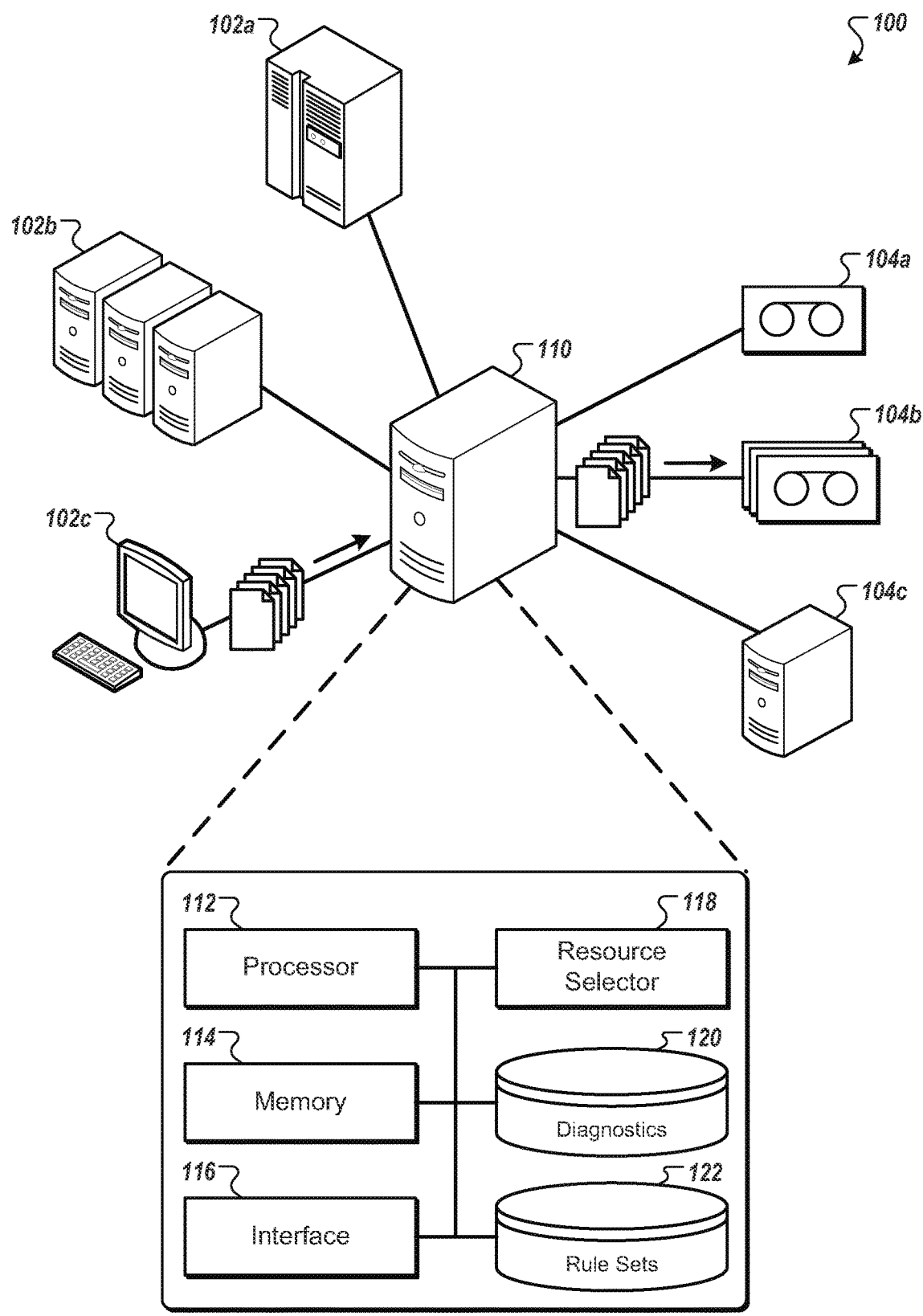
FIG. 1 shows a conceptual diagram of an example backup environment.

A backup system may protect vital data, e.g., in a data center, by storing the data in a persistent destination store. The destination store may include single or multiple storage devices of similar or disparate storage types, such as tape devices, tape libraries, or disk devices (local and/or network-based). Over a period of time or with a certain amount of usage, the reliability of the storage devices and/or respective storage media may begin to diminish, and the devices or media may begin operating at a less than optimal level. In some cases, the devices or the media may even fail. This can potentially result in the loss of important data.

According to the techniques described here, a backup system may identify a device and/or storage medium for use in a backup or restore operation based on diagnostic information that is indicative of the reliability of the devices and/or storage media available for use in the operation. Such techniques may improve the chances that such a backup or restore operation will be completed successfully, and may help to ensure that an organization's important data is adequately protected.

In one example implementation, a backup system may analyze the read error rate, reallocated sector count, spin retry count, command timeout, and/or other diagnostic parameters associated with a number of candidate disk devices available for use in a backup operation, and may select a particular disk device (e.g., one that is considered the most reliable, or one that meets a threshold level of reliability) to be used for the operation. As another example, the backup system may analyze the power on hours, read and/or write margins, head life percentage, and/or other diagnostic parameters associated with a number of tape devices available for use in a backup operation, and may select a particular tape device to be used for the operation. In other examples, various appropriate diagnostic parameters may be analyzed in association with other resources to be used in a data backup or restore operation, including for example network shares being used by disk devices, tape library components such as loading/unloading mechanisms, and the media itself (e.g., a tape medium or other appropriate medium).

In some implementations, a method for selecting a resource to be used in a data backup or restore operation may include determining, using a computing system, diagnostic information associated with a plurality of candidate resources that are available for use in a data backup or restore operation. The candidate resources may include a set of available storage devices, a set of available storage media, or both. The method may also include selecting, using the computing system, a recommended resource from among the plurality of candidate resources, the recommended resource being selected based at least in part on the diagnostic information. For example, the computing system may select what it considers to be the most reliable of the candidate resources as the recommended resource. The method may also include causing the data backup or restore operation to be performed using the recommended resource.

The techniques described here may be used, for example, to increase the chances that a particular backup or restore operation will be successful. In some cases, the techniques may also reduce the amount of time used for backup operations because the number of failed jobs may decrease, which in turn may reduce the number of rescheduled backup operations that are needed to ensure that certain data is protected. The techniques may also be used to proactively migrate "at-risk" data to more reliable data stores. These and other possible benefits and advantages will be apparent from the figures and from the description that follows.

FIG. 1 shows a conceptual diagram of an example backup environment 100. Environment 100 may include multiple data sources 102a, 102b, and 102c, and may also include multiple backup devices 104a, 104b, and 104c. The multiple data sources 102a-102c may be communicatively coupled to the multiple backup devices 104a-104c via a backup management computing device 110, which may be configured to control and manage the backup/restore process. The various computing devices may be interconnected through one or more appropriate networks. The example topology of environment 100 may provide data backup capabilities representative of various backup environments. However, it should be understood that the example topology is shown for illustrative purposes only, and that various modifications may be made to the configuration. For example, backup environment 100 may include different or additional components, or the components may be connected in a different manner than is shown.

Data sources 102a-102c need not all be of the same type. Indeed, in many environments, data sources 102a-102c will typically vary in type. For example, in an enterprise environment, data sources 102a-102c might take the form of database server clusters, application servers, content servers, email servers, desktop computers, laptop computers, and the like. Similarly, backup devices 104a-104c may vary in type. For example, backup devices 104a-104c may include disk devices, tape devices, and/or tape libraries. Other appropriate types of backup devices may also be used.

In some environments, a source agent component may execute on each of the data sources 102a-102c, and a media agent component may execute on the backup management computing device 110. The source agent component may be responsible for reading the data from the host device as specified in a backup policy. The data to be backed up may include specific files, file systems, databases, email/file/web servers, or any other appropriate type of data. The media agent component may be responsible for accepting the data from the source agent component and writing it to a destination backup device and/or backup medium, in the example shown, data source 102c is sending data to be backed up to backup device 104b via the backup management computing device 110.

In some implementations, the source agent component itself may be responsible for writing the data directly to the backup devices, rather than routing the data via the backup management computing device 110. In such cases, the host computing devices may include the functionality for automatically selecting an appropriate backup device in accordance with the techniques described here. Similarly, in these or other implementations, the source agent component and the media agent component may be independent from a central backup management entity, and the agents may be controlled and managed independently, e.g., by a backup/restore graphical user interface (GUI).

As shown, the backup management computing device 110 may include a processor 112, a memory 114, an interface 116, a resource selector 118, a diagnostics repository 120, and a rule set repository 122. It should be understood that the components shown here are for illustrative purposes, and that in some cases, the functionality being described with respect to a particular component may be performed by one or more different or additional components. Similarly, it should be understood that portions or all of the functionality may be combined into fewer components than are shown.

Processor 112 may be configured to process instructions for execution by the backup management computing device 110. The instructions may be stored on a non-transitory tangible computer-readable storage medium, such as in memory 114 or on a separate storage device (not shown), or on any other type of volatile or non-volatile memory that stores instructions to cause a programmable processor to perform the techniques described herein. Alternatively or additionally, backup management computing device 110 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

Interface 116 may be implemented in hardware and/or software, and may be configured, for example, to receive and respond to requested backup or restore operations. For example, interface 116 may be configured to receive a backup policy and data to be backed up from a data source, and may be configured to forward the data to be backed up to an appropriate backup device.

The backup device to be used in a backup operation may be specified, for example in a backup policy, or may be selected by the backup management computing device 110 in accordance with the techniques described here. For example, a GUI-based policy may allow a user to specify a particular device and/or medium to be used in the backup operation or to select an option to prefer a backup resource with better reliability characteristics, such that the system automatically selects an appropriate resource for use in the backup operation.

In the case where a particular backup device or medium is specified, the backup operation may be carried out using the specified resource. In the case where an appropriate resource is to be selected, the backup policy may also indicate a range of backup devices and/or media that are available for selection. The available devices and/or media may be considered, e.g., by resource selector 118, as potential candidates for use in the particular backup operation.

Resource selector 118 may execute on processor 112, and may be configured to determine diagnostic information associated with a plurality of candidate backup devices. For example, resource selector 118 may query diagnostics repository 120 to identify diagnostics information that has been stored about the candidate backup devices and/or backup media. Although the diagnostics repository 120 is shown as a component of backup management computing device 110, it should be understood that the repository may be stored and/or maintained separately from the backup management computing device 110. For example, diagnostics repository 120 may be centrally stored and/or maintained using a separate computing device in environment 100 such that multiple backup management computing devices may share a single diagnostics repository 120. Resource selector 118 may also or alternatively query the candidate backup destination devices to request diagnostic information associated with the particular devices.

Diagnostics repository 120 may be maintained to include current and historical diagnostic information about individual backup destination devices and backup media. In some cases, diagnostics repository 120 may store information for all or a subset of the devices and/or media in a given datacenter. Each backup device and/or backup media may be uniquely identified in the diagnostics repository 120, e.g., by an associated vendor identifier, product identifier, serial number, and/or device type, or by another appropriate identifier or combination of identifiers. The diagnostic information maintained in diagnostics repository 120 may include a number of different diagnostic parameters, as well as current and/or historical values associated with those parameters. In some implementations, the diagnostic parameters may include certain parameters or combinations of parameters included in the Self-Monitoring, Analysis and Reporting Technology (S.M.A.R.T.) protocol. In some implementations, the diagnostic parameters may also or alternatively include other standard or proprietary diagnostic information. Other parameters, such as performance-related parameters, may also be monitored and maintained in diagnostics repository 120 in accordance with various implementations.

The specific diagnostic parameters associated with backup devices and/or media may vary according to the device type or medium. For example, certain diagnostic parameters associated with a disk device may be inapplicable in the context of a tape device, and vice versa. Some example diagnostic parameters associated with disk devices may include, for example, read error rate, reallocated sector count, spin retry count, command timeout, uncorrectable sector count, power on hours, or the like. In the case of network-based disk devices, other example diagnostic parameters may include, e.g., network interface card diagnostics information (NIC errors or read/write errors) and/or network throughput or other reliability parameters.

Some diagnostic parameters associated with tape devices may include, for example, power on hours, read margin, write margin, head life percentage, reposition life percentage, load/unload life percentage, frequency of cleaning needed, history of temperature information, history of drive performance numbers, history of tape load failures, read/write errors, or the like. In the case of tape libraries, other example diagnostic parameters may include, e.g., loading/unloading failures, number of inventoried tapes, and/or diagnostic information associated with a robotic controller. Some diagnostic parameters associated with tape media may include, for example, media cartridge wear information, number of times the tape has been reformatted, age of tape, or the like.

Along with the diagnostic parameters described above, certain observed values (e.g., read/write performance for particular backup sessions with a particular device, and/or the number of read/write errors for particular backup sessions) may also be stored in diagnostic repository 120. Such observed values may also be used in the selection of a backup device or medium in accordance with the techniques described here.

In some implementations, before a backup or restore operation begins, the backup management computing device 110 may query any candidate backup devices and/or media to update diagnostics repository 120 with the most recent diagnostic parameters associated with those devices and/or media. For example, in the case of tape devices, the diagnostic parameters may be retrieved from SCSI log pages present in the device; or, in the case of disk devices, the diagnostic parameters may be retrieved from the device by executing appropriate SCSUATA commands on the disk device. If a particular device or medium is not already included in the diagnostics repository 120, it may be added to the repository along with any associated diagnostic parameters as appropriate. If the particular device or medium is already included in diagnostics repository 120 (e.g., as identified in association with a unique identifier), the diagnostics information associated with the particular device may be updated.

Resource selector 118 may be configured to select a recommended backup resource (e.g., device or medium) from among the plurality of candidate resources based at least in part on the diagnostic information. The selection of the recommended backup resource may be based on one or more configurable rule sets, which may be stored in rule set repository 122. In some implementations, the rule sets may define weights associated with certain of the diagnostic parameters (e.g., based on the relative importance of the given parameter in a particular implementation), and may also define how the weighted values of the diagnostic parameters are to be combined. For example, the rule sets may be configured to account for the importance of given parameters as well as to acknowledge that, for certain parameters, lower values are indicative of better reliability, whereas for other parameters, higher values are indicative of better reliability.

The rule sets may be used to determine one or more reliability metrics (e.g., a score or a set of scores) that are indicative of the expected reliability or health of a given resource. For example, the resource selector 118 may combine a portion or all of the weighted diagnostic parameters associated with the respective candidate resources to calculate a reliability score for each of the candidate resources. Then, the candidate resource having the score indicative of highest reliability (e.g., highest or lowest score) may be chosen as the recommended resource for use in the backup or restore operation. In some implementations, multiple reliability metrics (e.g., each corresponding to a different category or sub-category of reliability) may be determined. The different metrics may result in different recommended resources, each of which may be suitable for a particular operation. In such implementations, the multiple recommended resources may be presented to a user for selection, or a rule set may be used to determine which of the resources should be used.

Resource selector 118 may also be configured to consider historical or trending diagnostic information in selecting a recommended resource for use in a backup or restore operation. For example, even if a current value of a diagnostic parameter is within an acceptable range (indicating a suitable level of reliability), analysis of the historical trend for that particular parameter may indicate that the values are trending towards an unacceptable range. In such cases, the resource selector 118 may favor a resource that is not trending towards unreliability over a resource that is. For example if the write error rate (for a disk device) or the write margin (for a tape device) has shown negative trending for the past few backup sessions, then such a device may not be recommended for a backup operation. As such, selecting the recommended resource may include determining historical trend information associated with at least one diagnostic parameter, and selecting the recommended resource based at least in part on the historical trend information.

In some cases, the historical trend information may indicate that a failure of the particular resource is possible or even likely. For example, if an error-related parameter started low, but then steadily increased over time (e.g., indicating that the resource is becoming less reliable), and the trend information shows a sudden increase in the rate of errors, a failure may be expected in the near future. Such a potential failure may be identified even if the current value of the parameter is still within an acceptable range that, taken alone, would be considered as reliable. In such cases where a potential failure is determined, the resource selector 118 may cause a notification to be generated to indicate the potential failure. The notification may then be provided to an administrator who may take appropriate action.

When a resource is determined to no longer be reliable for future backup or restore operations, the backup management computing device 110 may also indicate that the data processed by the unreliable resource should be copied elsewhere to mitigate against the possible loss of the data. In such cases, the backup management computing device may automatically trigger a copy of the at-risk data to be stored on a more reliable resource.

In some cases, the backup policy may provide a number of selection criteria that may be used to further define the selection parameters used by resource selector 118. The selection criteria provided by the backup policy may be based on the type of resource being selected. For example, in the case of a disk device being selected for use in a backup or restore operation, the backup policy may specify options such as whether to ignore throughput device performance numbers and/or device temperature values when recommending a particular disk device, and may also or alternatively specify whether a device with bad/unstable sectors may be recommended. As another example, in the case of a tape device being selected for use, the backup policy may specify whether a drive with a cleaning required signal may be recommended, and may also or alternatively specify a read margin percentage threshold, a write margin percentage threshold, a head life percentage threshold, or the like. In other examples, selection parameters related to tape libraries (e.g., robotic arm parameters), network conditions (e.g., network interface and throughput parameters), or other reliability parameters may also or alternatively be configured in the backup policy. Similarly, selection parameters related to the media (e.g., read/write error thresholds or the like) may also be configured in the backup policy. These and/or other reliability-related parameters may be presented via a graphical user interface to a user, and may be selected and/or specified in any appropriate combination.

Although environment 100 has been used to describe selecting a backup device or medium to be used in a backup operation, similar techniques may be used in the context of a restore operation. For example, in some cases, data may be backed up to a number of different backup devices and/or media, and the restoration of such data may be accomplished using any of the data backups. In such cases, the techniques described here may be used to select a recommended resource (from among the plurality of resources where the data is backed up) to be used in the restore operation. As in the backup context, the recommended resource for the restore operation may be selected based on the diagnostic information associated with the candidate resources, and a "most suitable" or "most reliable" resource may be selected for use in the restore operation. Similarly, the techniques may be applied in the context of an archival solution, a de-duplication solution, or any other appropriate context where the reliability of certain backup devices and/or media may have degraded over time.

Figure 2:
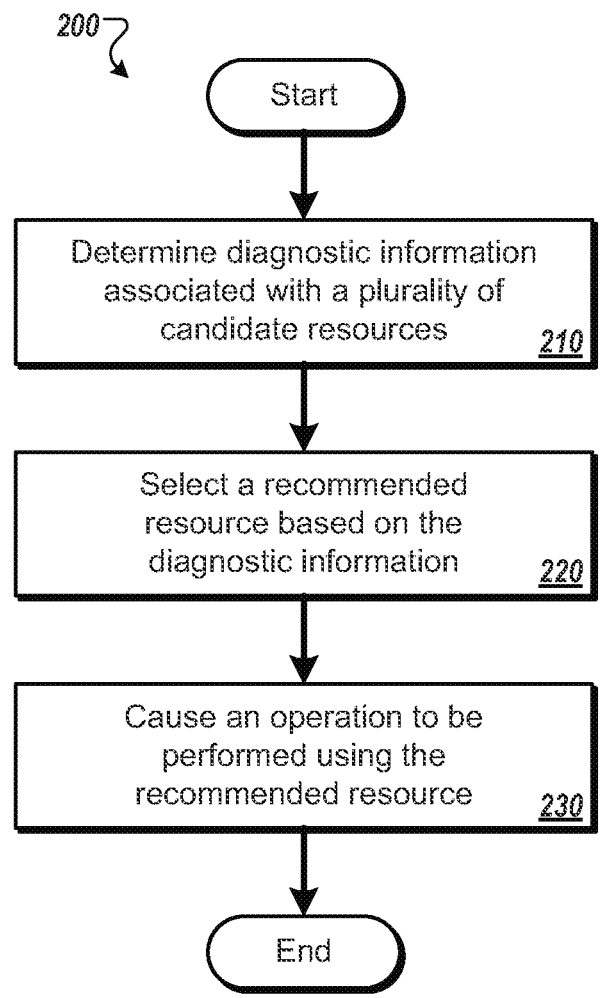
FIG. 2 shows a flow diagram of an example process for selecting a resource to be used in a data backup or restore operation.

FIG. 2 shows a flow diagram of an example process 200 for selecting a resource to be used in a data backup or restore operation. The process 200 may be performed, for example, by a backup management system, such as backup management computing device 110 illustrated in FIG. 1. For clarity of presentation, the description that follows uses the backup management computing device 110 as the basis of an example for describing the process. However, it should be understood that another system, or combination of systems, may be used to perform the process or various portions of the process.

Process 200 begins at block 210, in which diagnostic information associated with a plurality of candidate resources is determined. For example, backup management computing device 110 may query a repository of current and/or historical diagnostics information to identify diagnostics information associated with each of the plurality of candidate backup devices and/or backup media.

At block 220, a recommended resource is selected based on the diagnostic information. For example, backup management computing device 110 may determine the most reliable resource from among the plurality of candidate resources to be used in performing the data backup or restore operation. Which of the resources may be considered the most reliable resource may be determined by determining a reliability score for each of plurality of candidate resources, with the candidate resource having the highest (or lowest) score being considered the most reliable. The reliability score may be determined based on current and/or historical diagnostic information, e.g., according to a configurable rule set and/or a GUI policy.

At block 230, the backup management computing device 110 may cause the backup or restore operation to be performed using the recommended resource. For example, in the case of a backup operation, the recommended backup device and/or medium may be used to store the data to be backed up. In the case of a restore operation, the recommended backup device and/or medium may be used to restore the backed up data to the source device.

Figure 3:
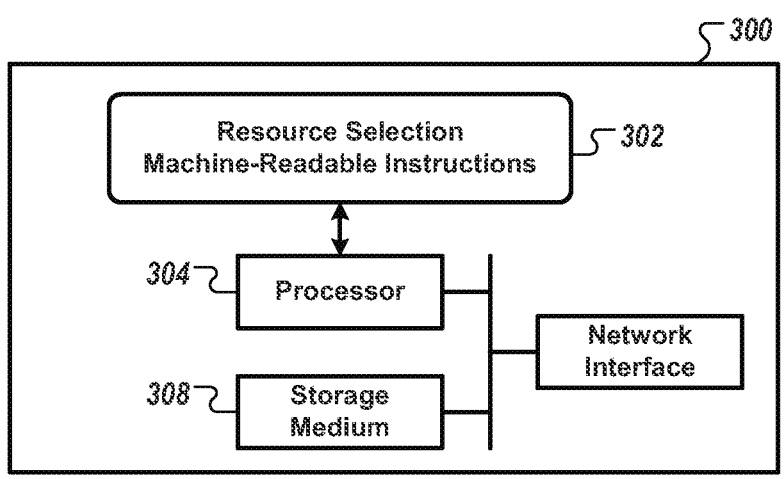
FIG. 3 shows a block diagram of an example system.

FIG. 3 shows a block diagram of an example system 300, which may be representative of the computing devices of FIG. 1. The system 300 includes resource selection machine-readable instructions 302, which may include certain of the various modules of the computing devices depicted in FIG. 1. The resource selection machine-readable instructions 302 are loaded for execution on a processor or processors 304. A processor can include a microprocessor, microcontroller, processor module or subsystem, programmable integrated circuit, programmable gate array, or another control or computing device. The processor(s) 304 can be coupled to a network interface 306 (to allow the system 300 to perform communications over a data network) and a storage medium (or storage media) 308.

The storage medium 308 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other appropriate types of storage devices. Note that the instructions discussed above can be provided on one computer-readable or machine-readable storage medium, or alternatively, can be provided on multiple computer-readable or machine-readable storage media distributed in a system having possibly plural nodes. Such computer-readable or machine-readable storage medium or media is (are) considered to be part of an article (or article of manufacture). An article or article of manufacture can refer to any appropriate manufactured component or multiple components. The storage medium or media can be located either in the machine running the machine-readable instructions, or located at a remote site, e.g., from which the machine-readable instructions can be downloaded over a network for execution.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method comprising:
    determining, using a computing system, diagnostic information associated with a plurality of candidate resources that are available for use in a data backup or restore operation, the diagnostic information comprising a read/write error parameter relating to errors in performing reads and writes of the plurality of candidate resources;
    determining, using the computing system, historical trend information associated with the diagnostic information;
    determining, using the computing system, that a value of the read/write error parameter of a first candidate resource of the plurality of candidate resources is within a predetermined acceptable range, but the historical trend information indicates that the read/write error parameter of the first candidate resource is trending toward an unacceptable range;

selecting, using the computing system, a recommended resource from among the plurality of candidate resources, the recommended resource being selected based at least in part on the read/write error parameter of the diagnostic information and the historical trend information, wherein the selecting avoids selecting the first candidate resource based on the read/write error parameter of the first candidate resource trending toward the unacceptable range; and causing the data backup or restore operation to be performed using the recommended resource.

2. The method of claim 1, wherein selecting the recommended resource comprises determining a reliability metric for each of the plurality of candidate resources based on the diagnostic information, and selecting the recommended resource based on the determined reliability metrics.

3. The method of claim 2, wherein determining the reliability metric for each of the plurality of candidate resources comprises combining values associated with a plurality of respective diagnostic parameters and corresponding weightings associated with the plurality of respective diagnostic parameters according to a rule set, the diagnostic parameters comprising the read/write error parameter.

4. The method of claim 1, wherein the historical trend information is used to determine a potential failure of at least one of the plurality of candidate resources.

5. The method of claim 4, further comprising causing data stored on the at least one of the plurality of candidate resources to be copied to another resource.

6. The method of claim 4, further comprising causing a notification to be generated, the notification indicating the potential failure.

7. The method of claim 1, wherein the diagnostic information comprises a further parameter selected from among a network throughput parameter relating to a throughput of a network, and a network error parameter relating to error in network communication, and wherein selecting the recommended resource is further based on the further parameter.

8. The method of claim 1, wherein the diagnostic information comprises a further parameter based on an observed performance of each of the plurality of candidate resources, and wherein selecting the recommended resource is further based on the further parameter.

9. The method of claim 1, wherein the plurality of candidate resources comprise a plurality of candidate backup devices, the first candidate resource comprises a first candidate backup device, and the recommended resource comprises a recommended backup device.

10. A system comprising:
a processor;
a non-transitory storage medium storing instructions executable on the processor to:
determine diagnostic information associated with a plurality of candidate backup destination devices for a data backup operation,
determine historical trend information associated with at least one diagnostic parameter included in the diagnostic information;
determine that a value of the diagnostic parameter of a first candidate backup destination device of the plurality of candidate backup destination devices is within a predetermined acceptable range, but the historical trend information indicates that the diagnostic parameter of the first candidate backup destination device is trending toward an unacceptable range;
select a recommended backup destination device from among the plurality of candidate backup destination devices based at least in part on the diagnostic information and the historical trend information, wherein the selecting avoids selecting the first candidate backup destination device based on the diagnostic parameter of the first candidate backup destination device trending toward the unacceptable range;
cause the data backup operation to be performed using the recommended backup destination device.

11. The system of claim 10, wherein the instructions are executable on the processor to determine a reliability metric for each of the plurality of candidate backup destination devices based on the diagnostic information, and select the recommended backup destination device based on the determined reliability metrics.

12. The system of claim 11, wherein determining the reliability metric for each of the plurality of candidate backup destination devices comprises combining values associated with a plurality of respective diagnostic parameters and corresponding weightings associated with the plurality of respective diagnostic parameters according to a rule set.

13. The system of claim 10, wherein the instructions are executable on the processor to cause data stored on the first candidate backup destination device to be copied to another device.

14. The system of claim 10, wherein the instructions are executable on the processor to generate a notification that indicates a potential failure of the first candidate backup destination device.

15. The system of claim 10, wherein the diagnostic information comprises a read/write error parameter relating to errors in performing reads and writes of the plurality of candidate backup destination devices, and wherein the selecting of the recommended backup destination device is based on the read/write error parameter.

16. The system of claim 10, wherein the diagnostic information comprises a further parameter selected from among a network throughput parameter relating to a throughput of a network, and a network error parameter relating to error in network communication, and wherein the selecting of the recommended backup destination device is based on the further parameter.

17. The system of claim 10, wherein the diagnostic parameter comprises a read/write error parameter relating to errors in performing reads and writes of the plurality of candidate backup destination devices, and wherein the recommended backup destination device is selected to avoid selecting the first candidate backup destination device based on the read/write error parameter of the first candidate backup destination device trending toward the unacceptable range.

18. A non-transitory computer-readable storage medium storing instructions that, when executed cause a system to:
determine diagnostic information associated with a plurality of candidate storage resources that are available for use in a data backup or restore operation, the diagnostic information comprising a read/write error parameter relating to errors in performing reads and/or writes of the plurality of candidate storage resources;

determine historical trend information associated with the read/write error parameter for the plurality of candidate storage resources;

determine that a value of the read/write error parameter of a first candidate storage resource of the plurality of candidate storage resources is within a predetermined acceptable range, but the historical trend information indicates that the read/write error parameter of the first candidate storage resource is trending toward an unacceptable range;

select a recommended storage resource from among the plurality of candidate storage resources, the recommended storage resource being selected based at least in part on the read/write error parameter of the diagnostic information, wherein the selecting of the recommended storage resource avoids selecting the first candidate storage resource based on the read/write error parameter of the first candidate storage resource trending toward the unacceptable range; and cause the data backup or restore operation to be performed using the recommended storage resource.

19. The non-transitory computer-readable storage medium of claim 18, wherein the plurality of candidate storage resources comprise a plurality of candidate backup devices, the first candidate storage resource comprises a first candidate backup device, and the recommended storage resource comprises a recommended backup device.

* * * * *